UNITED STATES PATENT OFFICE.

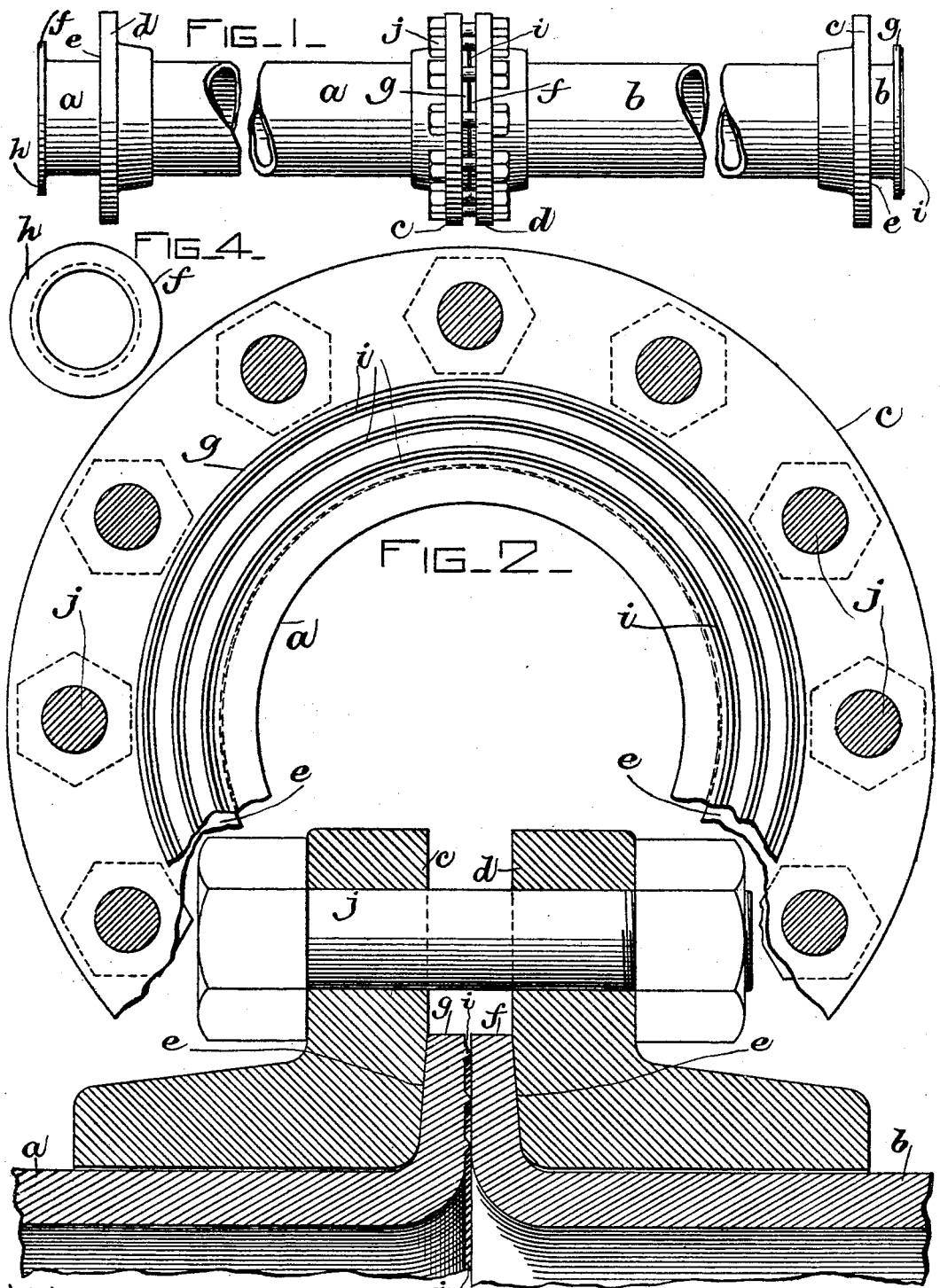

CHARLES VAN STONE, OF BOSTON, MASSACHUSETTS.

PIPE-JOINT.

No. 795,376.  Specification of Letters Patent.  Patented July 25, 1905.

Application filed March 10, 1905. Serial No. 249,414.

*To all whom it may concern:*

Be it known that I, CHARLES VAN STONE, a citizen of the United States, residing in Boston, in the county of Suffolk and State of Massachusetts, have invented certain new and useful Improvements in Pipe-Joints, of which the following, taken in connection with the accompanying drawings, is a specification.

My invention relates to joints or unions intended to connect lengths or sections of pipes, and it is devised with particular view to use in piping power-generating plants using gases or vapors under high pressure.

During the last few years it has daily come under my notice that the pressure of steam used in power plants has been greatly increased, and as the temperature of the steam has also been increased in even greater proportion, due to the very general introduction of superheating, the old forms of pipe-joints involving many parts and interposed packings have become inefficient, as the multiplicity of joints, disintegration of the packings or gaskets when not metallic, greatly-varying degrees of heat, expansion of parts of metallic packings of dissimilar metals, chemical or possibly electrochemical changes, due to the very highly-heated fluids in contact with these various metals and alloys, and many other causes apparent to those familiar with the art all have resulted in rendering such previous devices for joining pipe-sections a source of continual annoyance and expense, liable at any time to compel shutting down some of the units of the generating plant.

Now the object of my invention is to provide a pipe-joint having no interposed packing or gasket at the meeting pipe-sections, thus getting rid of the greatest source of failure under prevailing conditions. With this object in view I fetch well-finished faces of sections of pipe usually made of mild or open-hearth steel or other similar homogeneous metal derived from iron into contact to take advantage of cohesive forces of the like materials instead of trusting to the doubtful adhesion of unlike metals, as has been the previous practice. My joint is made up of few parts, none of which are brazed or otherwise permanently united, and steam at pressures of several hundreds of pounds superheated far above the corresponding temperature does not leak through my uncalked metallic joints.

My invention consists of a pipe-union in which the meeting pipe-sections are formed with faces flanged back at about right angles to the axes of the pipes, one exposed face of each pipe-section being finished flat and the other face of each pipe-section being finished with one or more ridges or rings beveled to a blunt angle, a thick edge, or nearly so, together with means for forcing the ridges or rings of one pipe-section into firm contact with the flat face of the meeting pipe-section, so any uneven crest of a ridge will be compressed or possibly made to flow over, or else the ridge may indent the opposed flat face of the meeting pipe-section, together with means to maintain the joints so formed.

The invention consists in preparing the meeting faces of pipe-sections of like materials, so that upon forcing the faces into contact with each other cohesive forces rendered active through such intimate contact may act to close the joint.

The invention consists in clamping suitably-prepared faces of meeting pipe-sections between beveled abutting surfaces, so that pressure of steam within the pipe or the expansion of the walls of the pipe because of their rise in temperature will act to more tightly jam the prepared faces into contact.

The invention consists in the selection of suitable materials and their best arrangement in view of the stresses and strains, largely due to changes in temperature of associated parts of the pipe-joint and other necessary conditions incident to the service required of the pipe-line.

The invention further consists of the devices and their combinations, as will more fully appear.

The drawings show in Figure 1 a side elevation of a couple of lengths of a line of pipe united with my joint; Fig. 2, an end elevation, on a large scale, of the face of the joint having ridges or rings; Fig. 3, an enlarged detached longitudinal section of the junction of the lengths of pipe, and Fig. 4, an end elevation of the plane or smooth face at one end of each length of pipe.

The pipes *a* and *b* are made, preferably, of open-hearth steel, this material being well suited for this purpose. Upon each pipe length two collars *c* and *d* are placed. These collars are usually made of mild steel or some other suitable material not greatly varying in heat expansion from the material of the pipe, although sometimes cast-iron is used for the collars. The collars fit the pipes somewhat loosely, as may be seen at Fig. 3, and the faces e are machine-finished to a bevel somewhat greater—that is, a few degrees—than a right angle. The end of each pipe is warmed up in a forge and formed back over the beveled faces e of the collars to make the flanges f and g. The face h of the flange f of each pipe is finished flat with machine-tools, and the face of the flange g is finished with machine-tools in one or more ridges or rings i. These ridges i are beveled at angles preferably exceeding a right angle to provide sufficient metal in the ridges to resist crushing the entire ring or ridge, while permitting some change or rearrangement along the sharpened crests of the ridges. If several rings are used, the outer one should be placed well back from the edge of the flange to prevent cracks from starting around the edge thereof. Although usually not necessary, sometimes, if the machine-tools are worn in their bearings, it is desirable to scrape the finished faces h and i a little until they test out fairly well. No special treatment (as hardening or annealing) of the finished faces h and i is required, the pipes being used just as they are left by the machine or hand tools. Hence it will be observed that the expense of preparation is not great and may be accomplished with means commonly at hand.

To unite two sections of a line of pipe, a flange f is placed against a flange g, the collars c and d are brought up to the rear faces of the flanges, and bolts j, which may be made of material of relatively low heat expansion, but of high tensile strength, are passed through holes in the flanges and tightened to force the ridges i of the flange g into close contact with the flat face h of the flange f. The rear faces of the flanges of the pipes, which are in contact with the beveled faces e of the collars, receive bevels tapering toward a plane at right angles to the axes of the pipes—that is, the distance is less through the flanges at their edges than at their roots near their junction with the walls of the pipes. This is due to the stretching and drawing of the metal of the pipes during the flanging operation and is a source of weakness in most pipe-joints, although not so in my construction. Besides, in my construction the bevel of the rear faces of the flanges is turned to advantage. Particular attention is directed to the loose fit of the collars on the pipes and to the tapering bevel of the finished faces of the collars, between which the flanges g and f are clamped, and as the beveled faces e of the collars correspond to the bevel of the rear faces of the flanges of the pipes slipping or sliding of one over the other is facilitated. From this arrangement it is apparent that pressure of steam within the pipe or any creeping outward of the flanges g and f, due to the high temperature, only acts to greatly multiply the forces, crowding the finished faces of the flanges together in the axial line of the piping system.

It is to be understood that the piping, with joint complete, is covered with material slow to conduct heat; but for all this there is a difference of temperature between the walls of the pipes in contact with the steam and the collars and bolts, which are much farther away therefrom, and the arrangement of parts is such that advantage is taken of this matter to improve the working of the joint.

Having described my invention, I claim and desire to secure by Letters Patent of the United States—

In a pipe-joint, pipes flanged at an angle to their axes and the flanges opposed to each other in the same axial line, one flange faced flat, the other flange having its opposing face provided with a plurality of angular ridges or rings, and beveled faces on the back of the flanges, combined with support-collars loosely fitted to the pipes and having annular collars, means passing through the annular flanges to draw the collars toward each other and thereby clamp the flanges of the pipes between the collars, and beveled surfaces on the collars matching the beveled rear faces of the flanges inclined in a direction to deflect the finished faces of the flanges into closer contact with each other, as the flanges of the pipes slide outward over the beveled surfaces of the collars when under heat and pressure, substantially as described.

In testimony whereof I have hereunto subscribed my name this 18th day of February, A. D. 1905.

CHARLES VAN STONE.

Witnesses:
W. S. EARLE,
A. O. ORNE.